US012653751B2

(12) United States Patent
Bleau

(10) Patent No.: US 12,653,751 B2
(45) Date of Patent: Jun. 16, 2026

(54) MULTI-USE MOBILITY AID DEVICE

(71) Applicant: Telo LLC, North Oaks, MN (US)

(72) Inventor: Steven Bleau, Bloomington, MN (US)

(73) Assignee: Telo LLC, North Oaks, MN (US)

( * ) Notice: Subject to any disclaimer, the term of this patent is extended or adjusted under 35 U.S.C. 154(b) by 1045 days.

(21) Appl. No.: 17/677,659

(22) Filed: Feb. 22, 2022

(65) Prior Publication Data

US 2022/0273508 A1 Sep. 1, 2022

Related U.S. Application Data

(60) Provisional application No. 63/154,466, filed on Feb. 26, 2021.

(51) Int. Cl.

*A61H 3/04* (2006.01)
*A61G 5/02* (2006.01)
*A61G 5/08* (2006.01)
*A61G 5/10* (2006.01)
*A61G 5/12* (2006.01)

(52) U.S. Cl.

CPC ................ *A61H 3/04* (2013.01); *A61G 5/02* (2013.01); *A61G 5/08* (2013.01); *A61G 5/1056* (2013.01); *A61G 5/122* (2016.11); *A61H 2230/06* (2013.01)

(58) Field of Classification Search

CPC .... A61H 2230/06; A61H 3/04; A61G 5/1056; A61G 5/08

See application file for complete search history.

(56) References Cited

U.S. PATENT DOCUMENTS 2,776,701 A * 1/1957 Denis ........................ A61H 3/04 297/5
4,456,086 A * 6/1984 Wier ...................... B62D 51/02 297/DIG. 10
4,462,605 A * 7/1984 Morgan ............... A61G 5/1035 180/10
4,893,826 A * 1/1990 Ward ....................... A61G 5/00 280/47.4
5,224,721 A * 7/1993 Santmann ................ A61H 3/04 280/87.051
6,125,957 A * 10/2000 Kauffmann ............. B60L 50/52 297/DIG. 10

(Continued)

OTHER PUBLICATIONS

International Search Report and Written Opinion issued in PCT/US2022/017306, dated Jun. 2, 2022.

*Primary Examiner* — Robert Canfield

(74) *Attorney, Agent, or Firm* — Westman, Champlin & Koehler, P.A.; Amanda M. Prose

(57) ABSTRACT

A mobility aid device constructed using internal couplings and capable of functioning as a rollator walker and transfer/transport chair through a convertible seat to backrest design. As a rollator walker, the device features a reverse wrap-around/posterior frame and is capable of detecting falls while providing continual data regarding its use through monitoring components built into the frame and which are visualized on a corresponding mobile application. The data is leveraged for therapeutic purposes through analysis leading to insights about gait patterns, energy levels, and device reliance and access to the data by physical therapists who can engage with the mobile application to assign exercises, monitor patient metrics, and engage with patients remotely.

17 Claims, 8 Drawing Sheets

(56) References Cited

U.S. PATENT DOCUMENTS

| | | | | |
|---|---|---|---|---|
| 6,338,493 | B1 * | 1/2002 | Wohlgemuth | A61G 5/00 280/30 |
| 7,273,255 | B2 * | 9/2007 | Nylander | A61G 5/127 297/DIG. 10 |
| 8,480,100 | B2 * | 7/2013 | Staggs | A61G 5/1002 280/87.021 |
| 8,584,689 | B2 * | 11/2013 | Catton | A61H 3/04 135/67 |
| 9,314,395 | B1 * | 4/2016 | VanAusdall | B62B 3/02 |
| 9,649,236 | B1 * | 5/2017 | Wike, Jr. | A61G 5/128 |
| 9,913,773 | B2 * | 3/2018 | Karlovich | A61H 3/008 |
| 10,285,649 | B1 * | 5/2019 | Murray | G01C 21/3461 |
| 10,292,893 | B2 * | 5/2019 | VanAusdall | B62B 5/0438 |
| 10,646,396 | B2 * | 5/2020 | Lass | A61G 7/1038 |
| 11,285,059 | B1 * | 3/2022 | Alexander | A61G 5/14 |
| 11,622,908 | B2 * | 4/2023 | VanAusdall | A61H 3/04 280/647 |
| 12,213,936 | B2 * | 2/2025 | VanAusdall | B62B 5/0438 |
| 12,396,914 | B2 * | 8/2025 | Cumella | A61H 3/04 |
| 2001/0048206 | A1 * | 12/2001 | Niu | A61H 3/04 482/68 |
| 2002/0121755 | A1 * | 9/2002 | Workman | A61H 3/008 280/87.021 |
| 2008/0142315 | A1 * | 6/2008 | Kim | F16D 51/48 188/110 |
| 2013/0264800 | A1 * | 10/2013 | Kobayashi | A61G 5/006 280/650 |
| 2017/0231857 | A1 * | 8/2017 | VanAusdall | B62B 5/0438 280/650 |
| 2019/0209418 | A1 * | 7/2019 | VanAusdall | A61H 3/04 |
| 2019/0240106 | A1 * | 8/2019 | Kapec | A61H 3/04 |
| 2020/0146926 | A1 * | 5/2020 | Liu | A61H 3/04 |
| 2021/0022947 | A1 * | 1/2021 | VanAusdall | B62B 5/0438 |
| 2021/0236022 | A1 * | 8/2021 | Shugert | A61B 5/1128 |
| 2021/0370997 | A1 * | 12/2021 | Lybbert | A61H 3/04 |
| 2022/0054335 | A1 * | 2/2022 | Stajic | A61G 5/14 |
| 2023/0028131 | A1 * | 1/2023 | Hooworth | A61G 5/0841 |
| 2023/0390130 | A9 * | 12/2023 | Stajic | A47C 15/004 |
| 2024/0050303 | A1 * | 2/2024 | VanAusdall | B62B 5/0438 |
| 2026/0014045 | A1 * | 1/2026 | Li | A61H 3/04 |

* cited by examiner

MULTI-USE MOBILITY AID DEVICE

CROSS-REFERENCE TO RELATED APPLICATION

This application claims priority to and the benefit of U.S. provisional patent application Ser. No. 63/154,466, filed on Feb. 26, 2021, the contents of which are incorporated herein in its entirety.

BACKGROUND

The present invention relates to a mobility aid device and more specifically to a mobility aid device with teletherapy and activity tracking integration.

Mobility aids include devices designed with the purpose of assisting ambulatory persons with their walking or movement. Some common mobility aids include canes, walkers, wheelchairs, power chairs, and rollator walkers of which the present invention is most concerned.

A rollator walker is a mobility device used by individuals to provide extra stability while walking. This device is used by a variety of individuals including those with ambulatory problems due to old age or underlying health conditions. A rollator walker generally consists of a frame, three or four wheels, handlebars and a braking system. Often, a rollator walker will also have a seat built into its frame.

Conventional rollator walkers consist of a metal constructed frame, 3 or 4 wheels, a seat, and handlebars that allow the user to push the device as they walk for balancing support. This pushing motion often causes the rollator to get too far ahead of the user causing poor posture and falls. While providing some stability, this design does not leave users with much confidence while walking as by pushing forward on the device it often feels the rollator walker is “running away.” This leads users to have poor control over their device and a greater risk of falling.

Additionally, the design is difficult to use on sloped or uneven surfaces. For example, the user may have insufficient strength and mobility to control the rollator on a downward decline. Further, this design promotes poor posture and gait with users often embodying hunched over positions as they walk.

Current rollator walkers aid ambulation, but they often lead to mobility issues themselves by encouraging poor posture, correlating to fall risk and instability by being difficult to stop and control, and causing injuries when transporting. Falls, specifically, present major financial burdens to both the individual user and the nation’s healthcare system.

Experts believe the best way to address fall risk is through proper mobility aid usage, staying active, and utilizing physical therapy. All three have been shown to be underutilized, with physical therapy, specifically, often being a crucial missing piece. This is because physical therapy is not easily accessible on a daily basis often being confined to taking place in a clinic and doing independent home exercises.

Mobility aid designs do not help the problem of underutilized physical therapy because many mobility aids currently don’t have rehabilitation monitoring incorporated into its design. Rather, rehabilitation is done in the home without the support of a physical therapist, visualization tools, or data metrics. This can be difficult for the individual in staying accountable to their rehabilitation and for the physical therapist who does not know what happens in between visits or how an individual’s gait appears out of the clinic.

Walking aid users are left estimating their baselines to determine if they are making progress or plateauing with no access to real data or progression metrics. This makes rehabilitation extremely difficult. While innovation in other industries has skyrocketed in the last few decades, mobility aid designs, specifically rollators, have remained stagnant looking almost identical to those developed 40 years ago. Mobility aids have not incorporated technology in a way that improves home therapy and use.

SUMMARY

An aspect of the present disclosure relates to a mobility aid device having a frame with a lower end and an upper end, the lower end of the frame having one or more pairs of ground engaging wheels and the upper end of the frame comprising a pair of handles, the frame further providing a user space at least partially within a perimeter of the frame; and a support surface pivotally secured to the frame, the support surface pivotable between a first position and a second position, wherein in the first position the support surface provides a back rest to the mobility aid device and in the second position provides a seat to the mobility aid device; wherein when the support surface is in the second position, the support surface is positioned within the user space. As the support surface is in the first position, the support surface is positioned at a rear of the frame to open the user space within the frame and wherein the user space is in front of the support surface.

The support surface comprises two surfaces and the two surfaces are each positioned along non-parallel planes.

The device further has two pairs of ground engaging wheels and wherein in a first pair of wheels are a front pair of wheels and a second pair of wheels are a rear pair of wheels. In the first position the support surface is pivoted upwardly and rearwardly from the second position and in the first position the support surface is positioned above and over the rear pair of wheels to open the user space to allow a user to stand within the frame and in front of the support surface.

The handles are rotatably coupled to the frame.

The frame is configured with one or more adjustable elements to change a size of the device corresponding to a user size and wherein at least the handles are adjustable to select a vertical height of the handles with respect to the frame.

The mobility aid device is collapsible for storage or transport.

The frame is a tubular framework and further comprises one or more internal couplings for enabling collapsibility of the frame for storage or transport, pivoting of the support surface, rotation of the handles or combinations thereof.

The one or more pairs of wheels are omnidirectional wheels operably coupled to the frame for omnidirectional movement of the mobility aid device.

The device is a transport chair, transfer chair, walker, rollator, or combination thereof.

The device has a braking system coupled to at least one of the at least one pair of wheels and has a trigger accessible from at least one handle.

In one or more embodiments, the device has a teletherapy metric collection system that comprises one or more data collection devices integrated into the mobility aid device, wherein the one or more data collection devices comprises one or more sensors, accelerometers, cameras, or a combination thereof. The system has a technology interface in communication with the one or more data collection devices and is configured to analyze, interpret, utilize, and/or display data and/or visuals obtained by the teletherapy metric collection devices integrated into the mobility aid device.

Another aspect of the present disclosure relates to a multi-use mobility aid device having a wheeled frame having a seat and back rest assembly pivotable between two positions on the frame and a pair of handles rotatably coupled to the frame. In a first configuration, the mobility aid device is a rollator walker and in a second configuration, the mobility aid deice is a transport or transfer chair. The mobility aid device is switchable between the first and second configurations manually and without tools.

The device also has a fall detection system.

The fall detection system includes one or more position sensors, accelerometers or a combination thereof.

The frame has a tubular framework supporting one or more internal couplings for enabling transition of the device between the first and second configurations and for collapsibility of the wheeled frame for storage.

Yet another aspect of the present disclosure relates to a teletherapy metric collection system for a mobility aid device. The system has one or more data collection devices operably coupled to the mobility aid device and a technology interface in communication with the one or more data collection devices and configured to analyze, interpret, utilize, and/or display data and/or visuals obtained by the teletherapy metric collection devices integrated into the mobility aid device. The data metrics collected by the one or more data collection devices are stored on-board the mobility aid device and are transmitted to the technology interface by a transmitter allowing continuous access to data relating to mobility patterns.

The one or more data collection devices includes at least two data collection devices, wherein the data collection devices could comprise a pulse oximeter, magnetic rotary encoders, strain gauges, accelerometers, GPS, haptic feedback module, heart rate monitor, hall effect sensors, lidar sensors, or combinations thereof.

DETAILED DESCRIPTION

Figure 1:
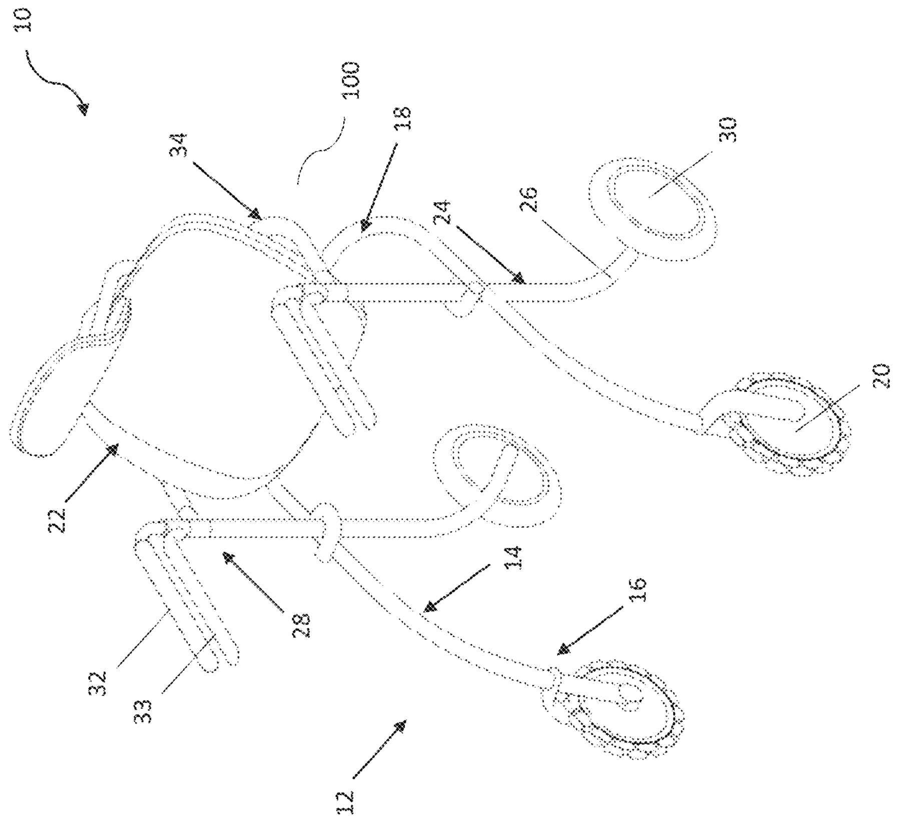
FIG. 1 is a front perspective view of a multi-use mobility device according to one or more embodiments described herein, the device in a rollator use position.

The devices described herein address the need for a mobility device, such as a rollator device or walker, with improved mobility, posture and rehabilitation functionality and which facilitates the user's ability to move and be supported by the device. The device also addresses the need of a mobility device that improves user rehabilitation by tracking, storing, visualizing and sharing data relevant to the user's use of the device. Still further, the device addresses the need for a mobility device that provides added beneficial functionality in fall situations, including identifying a fall and locating the device (and user) to aid in recovery after such a fall. The device(s) described herein address the issues associated with conventional mobility devices, correct and improve upon the deficiencies in the prior art, and provide a means to circumvent the associated drawbacks of such prior art designs.

The device according to one or more embodiments described herein is a mobility aid device that can be utilized as a rollator walker and transport/transfer chair. The device comprises a seat that can switch between two orientations and comprises rotating handlebars. This versatility allows a user the simplicity of having one device that fits a wider range of needs, instead of the alternative, which requires multiple devices for specific use cases. Additionally, the device gives the user the choice to take a break if energy levels start to drop by switching from walking to sitting or riding.

In accordance with one or more embodiments described herein, when the device is used as a rollator walker, the device features a reverse/posterior frame in which the device supports the user from behind as they walk and remains open in the front. Unlike the current anterior frames of the prior art, this design gives users posterior support allowing for proper spine alignment and posture as they walk. The stooped posture is avoided, improving an individual's gait, providing added rehabilitation functionality, and leading to a more confident and able person. With the device living behind the user as they walk, they are also given more control with the device, never feeling like it's "running away" from them. This decreases the risk of a fall. This device also proves useful on sloped or uneven surfaces, allowing the device to remain closely positioned relative to the user and keeping greater control of the device with the user. On a more emotional level, having the device open in the front versus the back opens the individual to the rest of the world. They no longer have to be reminded of their mobility limitations every time they look forward.

The mobility aid device may further feature integrated fall detection technology. This technology gives those with mobility limitations more independence in that if a fall does occur the device can provide support so the user can get back up. This will help decrease the reliance of individuals on caregivers. For example, in embodiments of the present invention, the mobility aid contains one or more accelerometers incorporated into the device that are used to indicate the occurrence of falls and may also alert others through a technology interface to a user fall by monitoring sudden shifts or tipping of the device. Accelerometers may also be used in tandem with rotary encoders to track a total number of user steps and calculate the stride length of the user.

The mobility device may also comprise a data collection system for monitoring the user's use of the device. For example, built into the mobility device's frame are various pieces of monitoring and data gathering devices, examples of which include but are not limited to a pulse oximeter, magnetic rotary encoders, strain gauges, accelerometers, GPS, haptic feedback module, heart rate monitor, hall sensors, lidar sensors, cameras, and other monitoring devices of the like. The data metrics collected by these components are stored on-board and sent to the user's mobile device through a transmitter to a mobile application, giving the individual constant access to data about their mobility patterns. This gives users a much more accurate baseline in contrast to estimating off non-quantitative measures. The mobile application is configured to and capable of leveraging the data to deliver insights on the users' reliance on the device, energy levels throughout the day amongst many other measures of progress. Users will be able to make more informed decisions and can always be confident in their abilities, while also finding areas they need improvement in. These areas can then be addressed through the mobile application therapy component.

The device can be used with a system that comprises the mobile (or desktop) application or "app". The mobile application allows users continuous access to information about their performance, health, and therapy. Users can enable access to their data by their physical therapists who can engage with the mobile application to assign exercises, monitor their patient's metrics, and engage with their patients remotely through video call. This brings therapy into the home and allows for more tailored therapy plans based on real-time and progression data.

Disclosed herein are two individual aspects which comprise a mobility aid device and a teletherapy integration and mobile application monitoring system. In one or more embodiments, the mobility aid device described herein can be used alone as a rollator walker and transfer chair. In another embodiment, the mobility aid device may be integrated with and compatible with the teletherapy integration components and configured to communicate with the monitoring system. It is also contemplated that the teletherapy integration and mobile application monitoring system can be used with other devices and retrofitted therewith.

Figure 2:
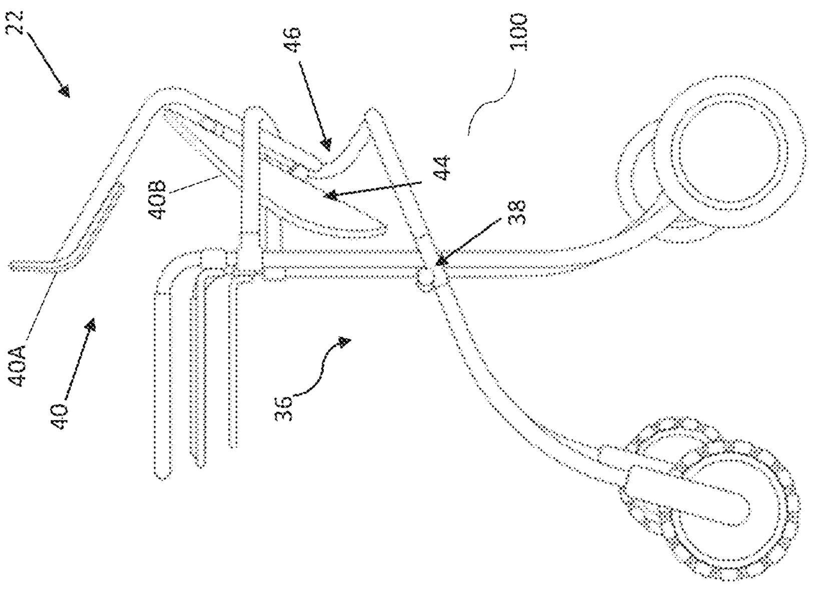
FIG. 2 is a side view of the device in the rollator use position.
Figure 3:
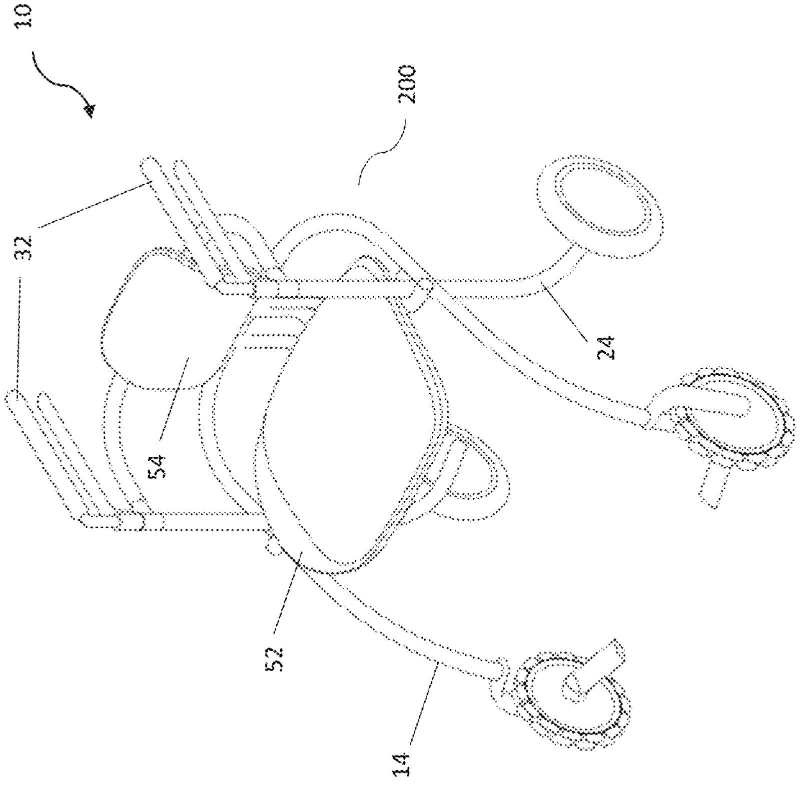
FIG. 3 is a front perspective of the device in a transport or transfer chair use position.
Figure 4:
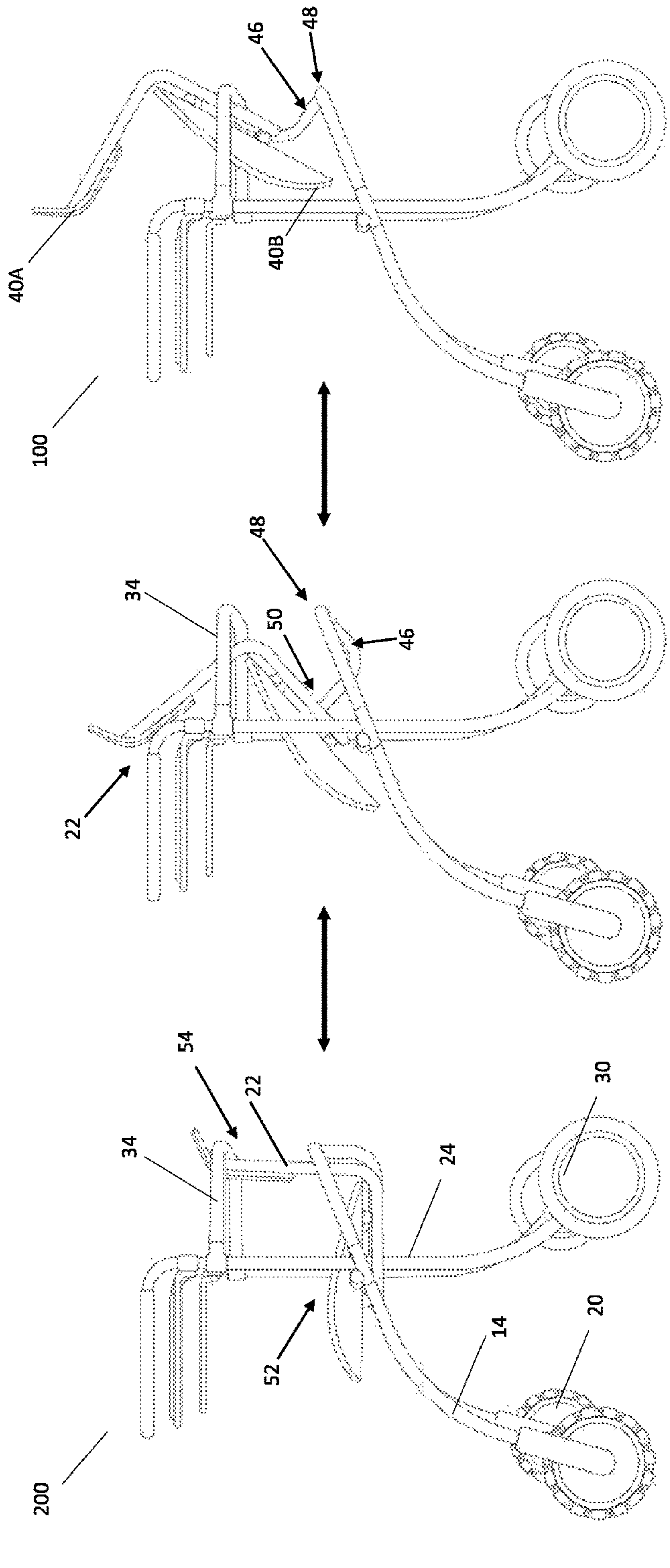
FIG. 4 is a side view illustrating the pivoting of a support surface of the device and thus transition of the device between rollator and transport or transfer chair use positions.

A mobility aid device 10 with multiple configurations and uses is illustrated in FIGS. 1-8. Referring first to FIGS. 1-2, the mobility aid device 10 has a first position 100 that allows the device to be used as a rollator walker. A second position 200 that allows the mobility aid device 10 to be used as a transfer chair illustrated in FIG. 3 and FIGS. 6-8. The mobility aid device 10 can be easily switched between the first 100 and second 200 positions with manual force and without tools as illustrated in FIG. 4.

In further detail, the mobility aid device 10 comprises a reverse wrap around frame 12 for the rollator walker design as shown in FIGS. 1-2. In the embodiment illustrated in the figures, the frame 10 comprises a front frame section 14 having a lower end 16 and an upper end 18 where the lower end 16 of the front frame section 14 is operably coupled to one or more ground engaging wheels 20. The upper end 18 of the front frame section 14 operably supports a support surface 22 of the device 10. A rear frame section 24 has a lower end 26 and an upper end 28 where the lower end 26 of the rear frame section 24 is operably coupled to one or more ground engaging wheels 30. The upper end 28 of the rear frame section 24 operably supports a pair of handles 32 and the upper end 28 of the rear frame section 24 also comprises a support section 34 for the support surface 22. The front frame section or assembly 14 and the rear frame section or assembly 24 may be operably and securely coupled to one another by connection mechanisms 38 on one or both sides of the frame 12 that allow for collapsing of the device 10 for storage or transport and secured expanding of the device for use of the device 10 in both the first 100 and second 200 configurations. Use of the terms "front" frame section 14 and "rear" frame section refer to the relative position of lower ends and ground engaging wheels attached to each frame section, the frame sections referred to with respect to one another. For example, when the device is used in the rollator walker design shown in FIGS. 1-2, one frame portion is "in front" of the other. These terms are non-limiting and are used for ease of illustration on the embodiment shown in the corresponding figures.

The handles 32 may be rotatably connected to or coupled to the frame 12, allowing the handles 32 to rotate and lock into place from a forward orientation to a rearward orientation and any other orientation within these two orientations with respect to the frame 12. The frame 12 comprises a tubular structure or framework, where the front frame section or assembly 14 and rear frame section or assembly 24 are tubular structures comprising one or more hollow tubes which may support internal couplings for operation of the device 10. The tubes may also allow for connection points to one or more components described herein in further detail below. The frame 12 may be comprised of titanium, aluminum, steel, metals or other materials providing strength and durability in a lightweight manner, or combinations thereof.

The frame 12 further has an overall shape that provides a user space 36 that is at least partially within a perimeter of the frame 12 and thus the frame sections 14 and 24 provide a reverse wrap around frame. This user space 36 is a space where the user may be positioned when using the device 10 as a rollator 100 or transfer or transport chair 200. The space 36 is in front of the device such that the user walks and "pulls" the device 10 as the weight of the device 10 is behind the user.

In one embodiment, when a user is using the mobility aid device 10 as a rollator walker 100, the frame 12 lives around the user as they walk. This posterior design is enabled by the support surface 22 and which is repositionable to function as lower back support 40 while the device 10 is in the first position 100 and can be used for walking, and to function as a seat 52 for sitting when the device 10 is in the second position 200 and can be used as a transport or transfer chair as shown in FIG. 3. The device 10 is configured with one or more structural mechanisms and/or connection points configured to lock in one or more orientations, such that device can be securely locked for safety and stability in both the first position 100 and second position 200.

The support surface 22 provides a passive reminder to stand upright and actively prevents stooped posture due to its inability to move ahead of the user. This allows for overall improvements in posture and prevents negative gait habits. As illustrated in the figures, a bottom 44 of the support surface 22 may be connected to the frame 12 by an arm 46 with one or more pivot points at each of the ends 48, 50 of the arm, 46. A pivot point 48A attached to the frame 12 allows the support surface 22 to be lifted and lowered, while a pivot point 48B attached to the bottom 44 of the support surface 22 allows the support surface 22 to rotate forward and backward. This allows the support surface 22 to serve as the mechanism for the device 10 to transition between the rollator walker 100 and transport chair 200 configurations as this moves the support surface 22 from one position within the user space 36 to a position at a rear of the user space 36.

The support surface 22 may thus function as a seat 52 with a backrest 54 and when moved to the rear of the user space 36 as the back support 40 having one or two user contact surfaces 40A, 40B and these user contact surfaces may have an upper contact support surface and a lower contact support surface.

In one or more embodiments, the frame 12 comprises disc brakes with internalized brake cables that provide variable resistance and a full locking configuration for the wheels 20, 30. In one embodiment the brakes could be anti-rollback brakes. Actuation of the brakes can be carried out by a hand brake 33 on the frame 12. If the user prefers an anterior, forward-facing frame, the device 10 can be flipped around allowing for dual usability.

The mobility aid device 10 comprises the pair of front wheels 20 which may be omni-directional, allowing the device 10 to move in all directions with ease and maneuver various terrains. The omni-directional wheels allow the user increased flexibility when using the device 10 as a rollator walker and transfer and/or transport chair. The omni-directional wheels 20 may for example be provided in 8-inch or 10-inch configurations with rubber rollers and spoke covers for weather resistance. The wheels 20 may also be provided with footrest portions 42 that are pivotally secured to the frame 12 in one embodiment.

Figure 5:
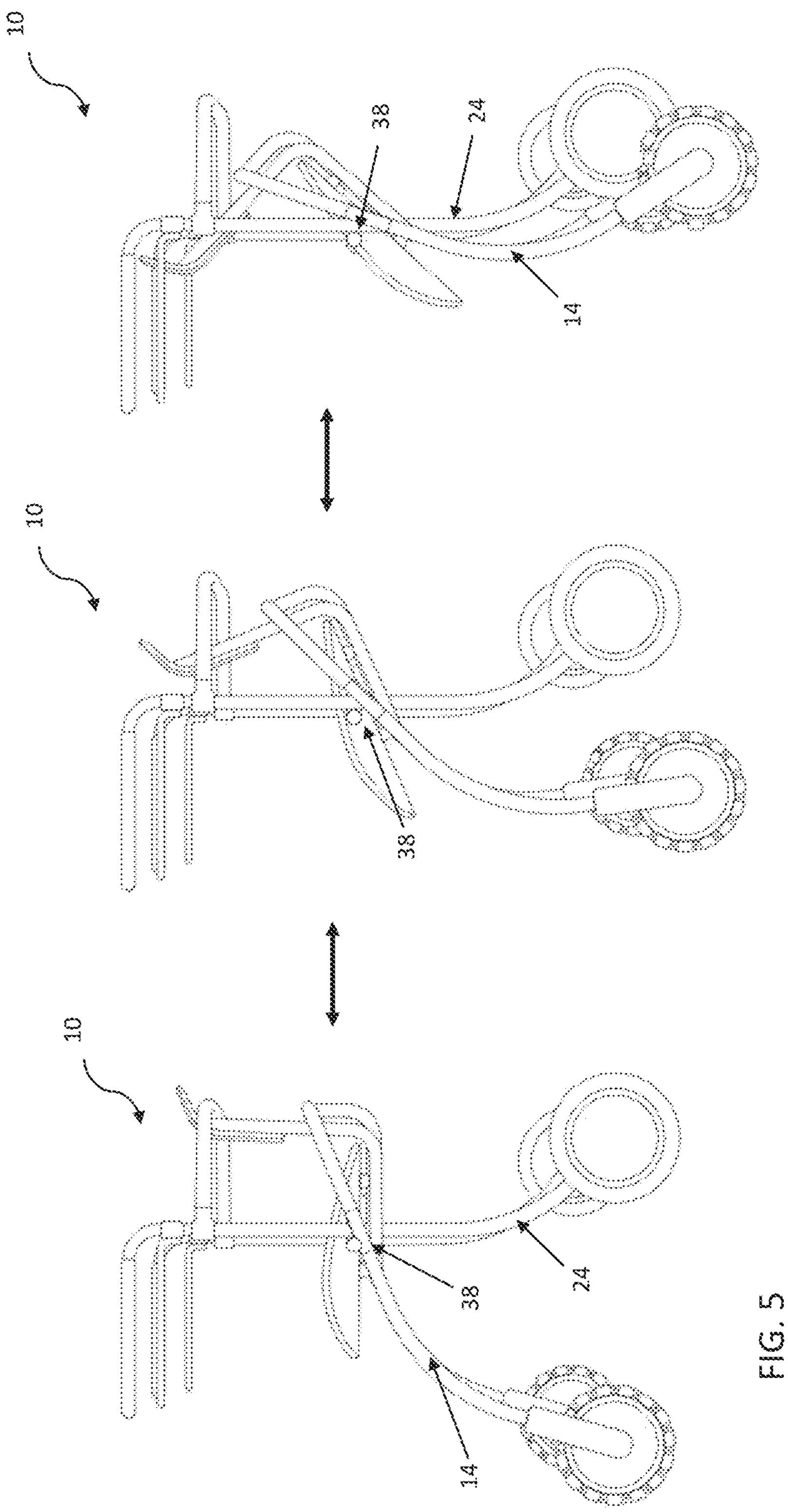
FIG. 5 is a side view illustrating dynamic movements of the frame to show collapsing of the device for storage or transport and expanding of the device for one or more uses.
Figure 8:
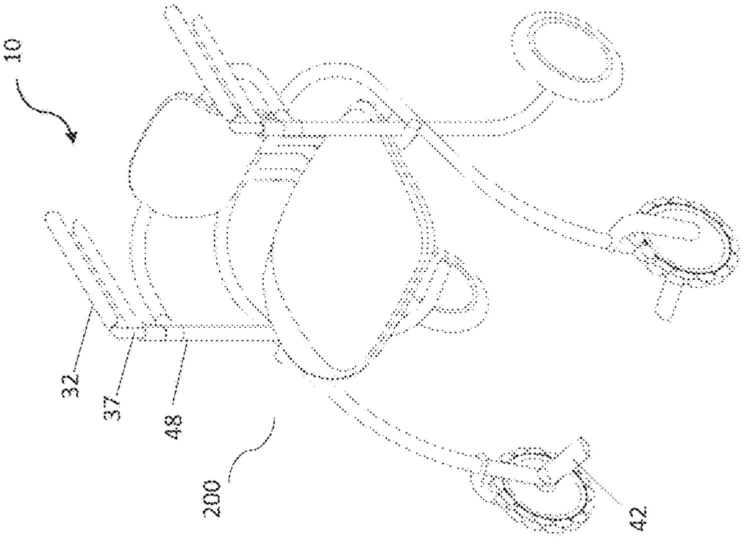
FIGS. 6-8 are front perspective views which illustrate additional moveable elements for various configurations of handles and footrest portions of the device.
Figure 7:
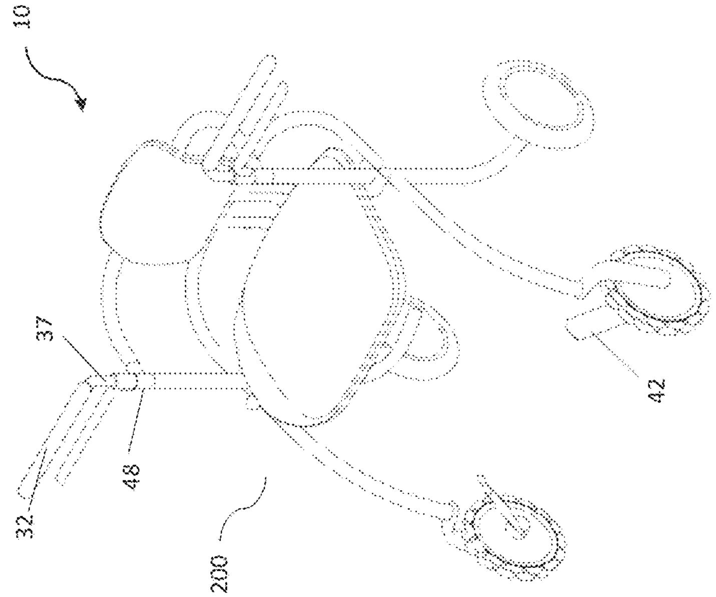
Figure 6:
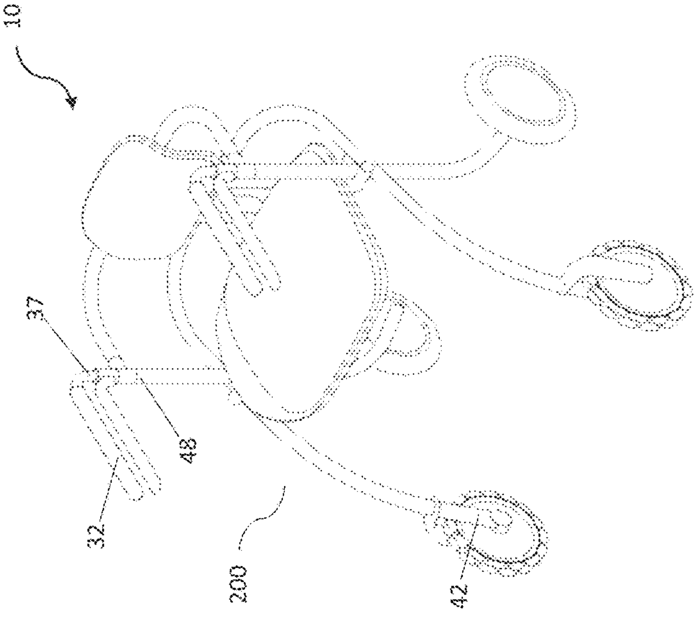

As illustrated in FIG. 5, the mobility aid device 10 is fully collapsible for storage and loading into cars, providing the device 10 with additional utility as a transport chair. The frame 12 comprises two pivot points 38 located at an intersection of the front frame assembly 14 and the rear frame assembly 24. This allows the frame 12 to manually transition between an extended wheelbase orientation and a contracted wheelbase orientation as shown in the figures.

When the mobility aid device 10 is provided with the support surface 22 pivoted down to provide a seat with a backrest, the user is able to sit in the seat and use the device 10 as a transfer and transport chair. The support surface 22 may be a full-sized fully ergonomic seat with cushions and back support to enhance comfort when the device is provided in the transfer/transport chair configuration.

The handles 32 further comprise a locking mechanism which can frictionally engage a base of the handle with the frame 12. When unlocked, each handle is able to rotate 360 degrees within the straight tube base 48 of the frame 12 as ends 37 of the handles 18 are inserted into the tube base in a rotatable manner. A lock is provided to engage with and secure the end of the handles 32 in a selected position. The handles 32 thus are rotatable between a user position for holding when using the device 10 as a rollator 100 and a caregiver position when the user is seated on the support surface 22 and the device 10 is acting as a transfer/transport chair 200. The caregiver position of the handles 32 allows another individual to push the device 10 from a position behind the device 10 while the user is seated, akin to pushing a user in a wheelchair.

In one or more embodiments, the handles 32 and grips therefore are removable and customizable. In addition to the handles 32, the device 10 is built to accommodate a range of accessories including but not limited to a cane holder, cup holder, and storage compartments, baskets or bags. The handles 32 may also feature an LED light matrix to display necessary information to the user. The frame 12 may similarly be provided with lights configured to illuminate an area in front of the device, allowing for easier navigation in the dark or dimly lit areas.

Figure 11:
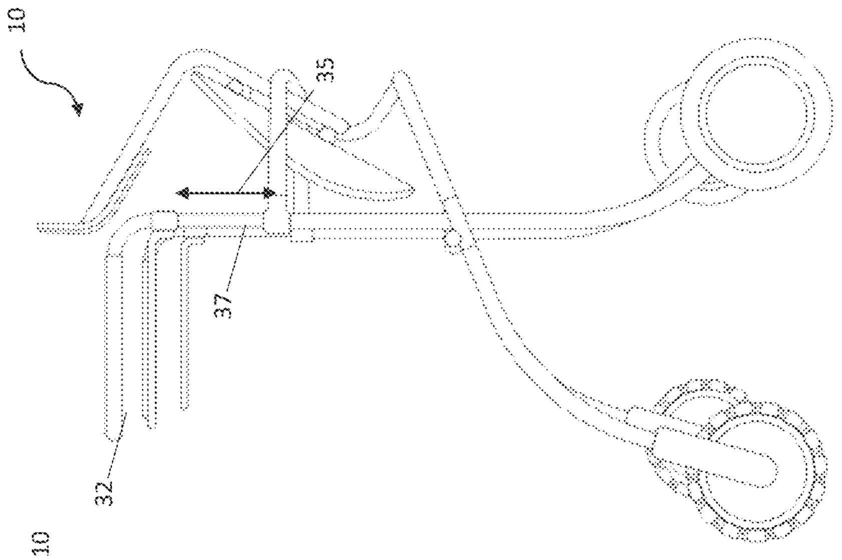
FIGS. 9-11 are side views illustrating size adjustment capabilities of the device.
Figure 10:
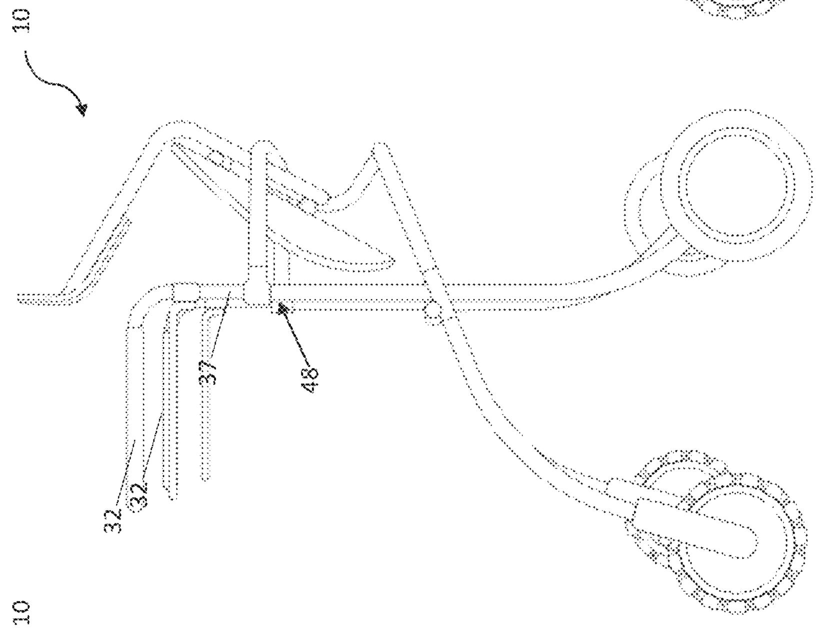
Figure 9:
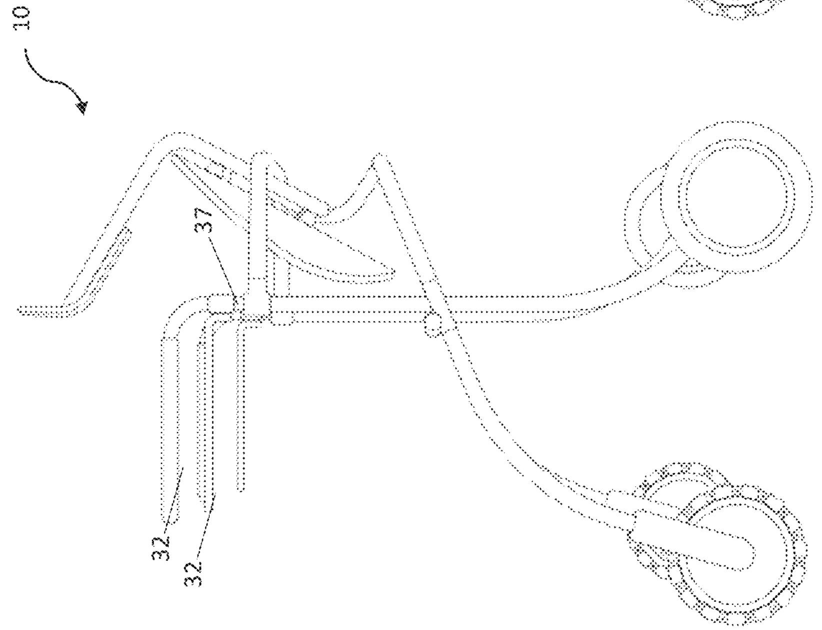
Figure 12:
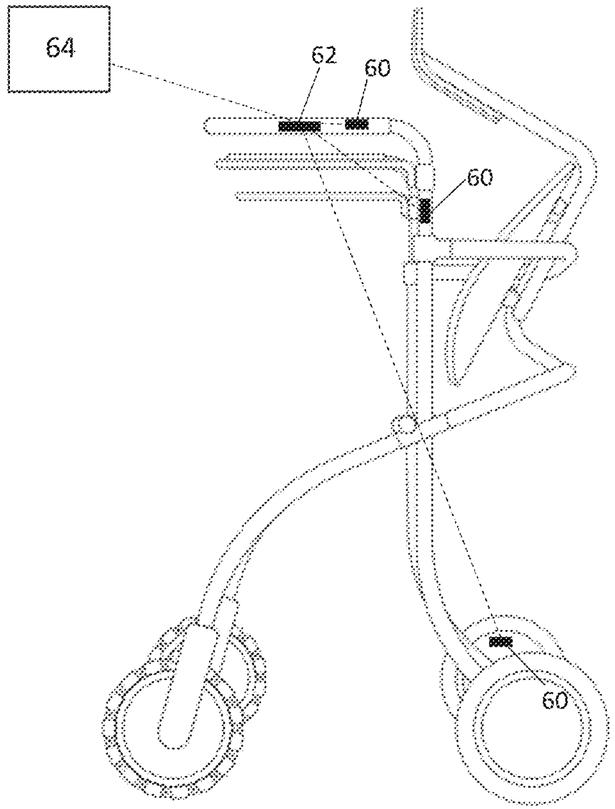
FIG. 12 illustrates a teletherapy metric collection system for mobility aid devices.
Figure 13:
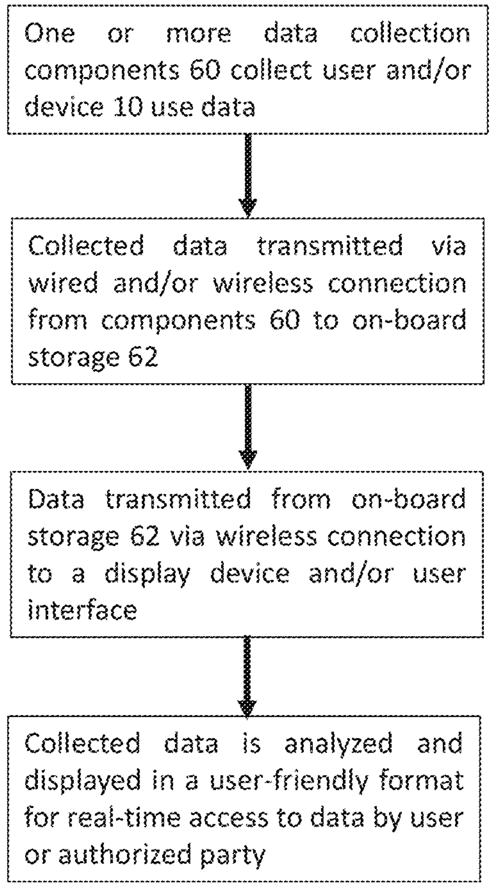
FIG. 13 is a flow chart illustrating collection and use of metrics collected by one or more devices incorporated into a mobility aid device.

To accommodate the sizes of different users the device 10 is provided in different base sizes and frame 12 measurements. For finer adjustments within the base sizes, for example, small, medium, and large devices 10, the handles 32 are adjustable and may slide up and down according to arrows 35 and lock in place with respect to the frame 10 as illustrated in FIGS. 9-11. The handles 32 are each provided with a vertical length 37 which may be slidable within the upper ends 28 of the rear frame section 24. Adjustment of the vertical height of the handles 32 in either of the first position 100 or second position 200 allows for tall and short users to adjust the device 10 for comfort.

In one or more embodiments, the device 10 may be integrated with a teletherapy metric collection system comprising one or more data collection components 60 described in further detail below. As illustrated in FIGS. 9-10, together with a technology interface in communication with the data collection components, the teletherapy metric collection system allows a user of the device 10 to track and monitor various activity and physical parameters when using the device. While the data collection components 60 are described in further detail below with respect to one or more embodiments of the mobility aid device 10 described herein, the data collection components 60 may be integrated into or otherwise coupled with any third party or pre-existing mobility aid device and used with the software and associated display device or application 64 described herein.

The technology interface is in communication with the one or more data collection devices 60 and/or on-board storage device 62 is and configured to analyze, interpret, utilize, and/or display data and/or visuals obtained by the teletherapy metric collection devices integrated into the mobility aid device 10 or nearly any style rollator walker or transport chair.

The data collection components 60 may comprise one or more of the following and various combinations thereof.

A pulse oximeter may be integrated into the device and for example may be provided within the frame 12 along the handles 32 for user contact. The pulse oximeter then collects continuous oxygen saturation values for the user holding onto the handles 32.

These values may be used to monitor user energy levels throughout the day based on activity trends and the values transmitted to a software display or technology interface.

One or more rotary encoders may be integrated into the device 10 and for example may be located near or on the two rear wheels 30 to measure a distance traveled each day and a time elapsed for use of the device 10 or to complete mobility assessments such as a 10-meter walk. The rotary encoders may be comprised of two parts, a magnet hub and a hall effect sensor. In one embodiment, the magnet hub comprises neodymium embedded in a 3" disc that is mounted on the inside of the wheel 30 and the hall effect sensor rests within the tubing of the rear frame assembly 24 next to the wheel.

The rotary encoders allow the mobile application to calculate speed and display timed assessments to the user. In addition to hall effect sensors, a rotary encoder integrated into the rear casters could be utilized to measure distance.

A haptic feedback module may be provided at the base of the handle 18 inserts or in the handles 32 or along the vertical handle length 37 and configured to alert the user of various notifications such as putting too much weight on the device, low battery, etc.

GPS integration may be provided within the frame 12, and the mobile application configured to allow the user to understand how active they are in different areas of their town or city. This feature may also be leveraged by city planners to see what areas are less accessible for individuals with limited mobility. This could also enable a loved one or caregiver to locate the user and/or device 10 after a fall or in an event where either is not visually spotted.

A heart rate monitor may be provided within the handles 32 on the frame 12 and allows users continuous pulse ratings to monitor energy levels throughout the day and during activity.

One or more strain gauges may be located at the base of the device 10 handles 32, along the vertical length 37 of the handles or otherwise in the frame 12 to allow users to track how much force or weight they are putting on the device in order to monitor device reliance.

Through the interface or the mobile application, users can track how applied weight changes throughout the day. This can give users an accurate representation of their baseline, allowing them to track and be aware when they are relying on the device 10 more than normal.

One or more accelerometers may be incorporated into the device 10 and used to indicate the occurrence of falls and may also alert others to a user fall by monitoring sudden shifts or tipping of the device. Accelerometers may also be used in tandem with rotary encoders to track a total number of user steps and calculate the stride length of the user.

The data collected by one or more of the components 60 listed above may be stored on-board through a storage module and/or hard drive integrated into a printed circuit board (PCB). The storage module and/or hard drive is in operative communication with the data collection components described above. A wireless transmitter is in operative communication with the storage module and/or hard drive and/or the data collection components for transmitting data to a personal electronic device, such as a smart phone, computer, or cloud storage. This transmitter may comprise a wireless transmitter, a Bluetooth transmitter, an NFC transmitter, a USB connection port, or the like. Housed within the electronics enclosure with the PCB may also be a wireless charging coil to recharge the device.

Each user may opt to keep the information gathered by the mobility aid device 10 and transmitted to the mobile application private, each user may also share their corresponding metrics with a third party such as a physical therapist, caregiver, friend, or family.

For example, physical therapists may be given the option to create a unique account on the mobile application that allows the therapist to see the metrics, data, and insights gathered from each of their patient's mobility aid device 10. Physical therapists may then leverage the data mentioned above to monitor patients' therapy in the home, allowing for more tailored therapy plans and recommendations.

Using the data metrics and information transmitted from the device 10, physical therapists could assign exercises through the mobile application for their patients to complete. An example would be completing a 10-meter walk in which the device can track the distance, speed, and weight put on the handles. Physical therapists can ensure their patients are completing home therapy and users are held more accountable. If the user and physical therapist want, the mobile application could also support video calls so the physical therapist can monitor home therapy in real time.

In addition to sharing their information with physical therapists, users can also join communities through the mobile application, allowing them to track and share their activities with friends and family.

Although the present disclosure has been described with reference to preferred embodiments, workers skilled in the art will recognize that changes may be made in form and detail without departing from the spirit and scope of the disclosure.

The invention claimed is:

1. A mobility aid device comprising:

a frame having a lower end and an upper end, the lower end of the frame comprising one or more pairs of ground engaging wheels and the upper end of the frame comprising a pair of handles, the frame further providing a user space at least partially within a perimeter of the frame; and a support surface rotatably secured to the frame wherein the support surface comprises two surfaces to provide a seat and a back rest portion to the support surface, the support surface being manually rotatable between a first position and a second position, wherein in the first position the support surface provides a forward facing surface at a rear of the user space to provide an upper body user support surface to the mobility aid device, and in the second position the support surface provides a seat with back rest to the mobility aid device;

wherein when the support surface is in the second position, the support surface is positioned within the user space;

wherein when the support surface is in the first position, the support surface is manually moved from within the user space to a position at a rear of the frame to open the user space within the frame and wherein the user space is in front of the support surface.

2. The mobility aid device of claim 1, and further comprising two pairs of ground engaging wheels and wherein in a first pair of wheels are a front pair of wheels and a second pair of wheels are a rear pair of wheels.

3. The mobility aid device of claim 2, wherein in the first position the support surface is rotated upwardly and rearwardly from the second position and in the first position the support surface is positioned above and over the rear pair of wheels to open the user space to allow a user to stand within the frame and in front of the support surface.

4. The mobility aid device of claim 1, wherein the handles are rotatably coupled to the frame.

5. The mobility aid device of claim 1, wherein the frame is configured with one or more adjustable elements to change a size of the device corresponding to a user size and wherein at least the handles are adjustable to select a vertical height of the handles with respect to the frame.

6. The mobility aid device of claim 1, wherein the mobility aid device is collapsible for storage or transport.

7. The mobility aid device of claim 1 wherein the frame is a tubular framework and further comprises one or more internal couplings for enabling collapsibility of the frame for storage or transport, pivoting of the support surface, rotation of the handles or combinations thereof.

8. The mobility aid device of claim 1 wherein the one or more pairs of wheels are omnidirectional wheels operably coupled to the frame for omnidirectional movement of the mobility aid device.

9. The mobility aid device of claim 1, wherein the device is a transfer chair, transport chair, walker, rollator, or combination thereof.

10. The mobility aid device of claim 1 and further comprising an anti-rollback braking system coupled to at least one of the at least one pair of wheels and having a trigger accessible from at least one handle.

11. The mobility aid device of claim 1 and further comprising a teletherapy metric collection system comprises one or more data collection devices integrated into the mobility aid device.

12. The mobility aid device of claim 11 wherein the one or more data collection devices comprises one or more sensors, accelerometers, cameras, or a combination thereof.

13. The mobility aid device of claim 11 and further comprising a technology interface in communication with the one or more data collection devices and configured to analyze, interpret, utilize, and/or display data and/or visuals obtained by the teletherapy metric collection devices integrated into the mobility aid device.

14. A multi-use mobility aid device comprising:

a wheeled frame supporting a seat and back rest assembly, wherein the seat and back rest assembly comprises a seat and back rest and the seat and back rest assembly is manually rotatable between two positions on the frame with respect to the frame, and a pair of handles rotatably coupled to the frame;

wherein in a first configuration, the mobility aid device is a rollator walker;

wherein in a second configuration, the mobility aid device is a transport or transfer chair; and wherein the mobility aid device is switchable between the first and second configurations manually and without tools.

15. The multi-use mobility aid device of claim 14 and further comprising a fall detection system.

16. The multi-use mobility aid device of claim 15 wherein the fall detection system comprises one or more position sensors, accelerometers or a combination thereof.

17. The multi-use mobility aid device of claim 14 wherein the frame comprises a tubular framework supporting one or more internal couplings for enabling transition of the device between the first and second configurations and for collapsibility of the wheeled frame for storage.

* * * * *